(12) United States Patent
Tang et al.

(10) Patent No.: US 10,135,915 B2
(45) Date of Patent: Nov. 20, 2018

(54) SYSTEM, METHOD AND APPARATUS OF DATA INTERACTION UNDER LOAD BALANCING

(71) Applicant: Alibaba Group Holding Limited, Grand Cayman (KY)

(72) Inventors: Meng Tang, Beijing (CN); Bo Chen, Hangzhou (CN); Yingbin Wang, Hangzhou (CN); Jia Wan, Hangzhou (CN); Qian Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 156 days.

(21) Appl. No.: 14/056,662

(22) Filed: Oct. 17, 2013

(65) Prior Publication Data

US 2014/0108661 A1 Apr. 17, 2014

(30) Foreign Application Priority Data

Oct. 17, 2012 (CN) .......................... 2012 1 0394875

(51) Int. Cl.
*G06F 15/173* (2006.01)
*H04L 29/08* (2006.01)
(Continued)

(52) U.S. Cl.
CPC ...... *H04L 67/1002* (2013.01); *H04L 67/1038* (2013.01); *H04L 29/08144* (2013.01);
(Continued)

(58) Field of Classification Search
CPC ......... H04L 29/08144; H04L 29/08153; H04L 29/08171; H04L 29/08198;
(Continued)

(56) References Cited

U.S. PATENT DOCUMENTS 6,182,139 B1 1/2001 Brendel
6,549,516 B1 4/2003 Albert
(Continued)

FOREIGN PATENT DOCUMENTS

CN 1400788 A 3/2003
CN 1426211 A 6/2003
(Continued)

OTHER PUBLICATIONS

"Li et al." "A 7th Layer Web Load Balancing System Based on TCP Migration," Apr. 10, 2005. Application Research of Computers, Issue 4, pp. 116-118.*

(Continued)

*Primary Examiner* — Liang Che A Wang
*Assistant Examiner* — Johnny B Aguiar
(74) *Attorney, Agent, or Firm* — Lee & Hayes, PC (57) ABSTRACT

The present disclosure discloses a system, a method and an apparatus of data interaction under load balancing to solve the problem of heavy workload of a server load balancer under existing technologies. The system includes a server load balancer, a real server, and a conversion apparatus. A data package, which is sent from a client to a real server, is processed and sent by the server load balancer to the real server. A data package, which is sent from the real server to the client, is processed and sent by the conversion apparatus to the client. Since the traffic flowing from the real server to the client does not pass through the server load balancer but is processed and sent by the conversion apparatus to the client in the above system that is provided by the embodiments of the present disclosure, the workload on the server load balancer is thus effectively reduced.

17 Claims, 7 Drawing Sheets

(51) Int. Cl.
  *H04W 28/08* (2009.01)
  *H04L 12/70* (2013.01)
  *H04L 29/12* (2006.01)
  *H04L 12/803* (2013.01)

(52) U.S. Cl.
  CPC ...... *H04L 29/08153* (2013.01); *H04L 47/125* (2013.01); *H04L 61/2007* (2013.01); *H04L 61/2503* (2013.01); *H04L 67/1004* (2013.01); *H04L 2012/568* (2013.01); *H04W 28/08* (2013.01)

(58) Field of Classification Search
  CPC ......... H04L 29/08234; H04L 29/08261; H04L 29/08288; H04L 47/125; H04L 67/1002; H04L 67/1004; H04L 67/1008; H04L 67/1014; H04L 67/1023; H04L 67/1027; H04L 67/1029; H04L 67/1036; H04L 67/1038; H04L 2012/568; H04L 29/12216; H04L 29/12339; H04L 61/2007; H04L 61/2503; H04W 28/08; G06F 9/5083
  USPC ....... 709/217, 219, 223, 224, 226, 238, 241, 709/244, 245, 246; 718/105; 370/389, 370/392
  See application file for complete search history.

(56) References Cited

U.S. PATENT DOCUMENTS

| | | | | |
|---|---|---|---|---|
| 6,996,615 | B1* | 2/2006 | McGuire | G06F 9/505 709/224 |
| 2003/0105903 | A1* | 6/2003 | Garnett | G06F 1/183 710/300 |
| 2003/0108052 | A1* | 6/2003 | Inoue | H04L 29/12377 370/399 |
| 2007/0288639 | A1* | 12/2007 | Brown | H04L 47/125 709/226 |
| 2008/0112374 | A1 | 5/2008 | Ramankutty et al. | |
| 2011/0176425 | A1 | 7/2011 | Li et al. | |
| 2011/0283013 | A1 | 11/2011 | Grosser et al. | |
| 2011/0295991 | A1* | 12/2011 | Aida | H04L 12/4625 709/223 |
| 2012/0198045 | A1 | 8/2012 | Sakata et al. | |
| 2012/0246637 | A1* | 9/2012 | Kreeger | H04L 45/54 718/1 |
| 2012/0303784 | A1* | 11/2012 | Zisapel | G06F 9/505 709/223 |
| 2013/0007109 | A1 | 1/2013 | Matsuhira | |
| 2013/0007253 | A1 | 1/2013 | Li et al. | |
| 2013/0159487 | A1 | 6/2013 | Patel et al. | |
| 2013/0166748 | A1 | 6/2013 | Christenson et al. | |
| 2013/0301413 | A1* | 11/2013 | Moen | H04L 67/1002 370/235 |

FOREIGN PATENT DOCUMENTS

| | | |
|---|---|---|
| CN | 1512377 A | 7/2004 |
| CN | 1545275 A | 11/2004 |
| CN | 101252591 A | 8/2008 |
| JP | 2012528551 A | 11/2012 |

OTHER PUBLICATIONS

Bestavros, et al., "Distributed Packet Rewriting and its Application to Scalable Server Architectures", 1998 Sixth International Conference on Network Protocols, Austin, TX, Oct. 13-16, 1998, pp. 290-297.

The PCT Search Report and Written Opinion dated Jan. 2, 2014 for PCT application No. PCT/US13/65484, 12 pages.

Translated Chinese Office Action dated Apr. 25, 2016 from Applicaton No. 201210394875.5, a counterpart foreign application of U.S. Appl. No. 14/056,662, 21 pages.

Li et al., "A 7th Layer Web Load Balancing System Based on TCP Migration," Apr. 10, 2005, Application Research of Computers, Issue 4, pp. 116-118, Abstarct only.

Translated Japanese Office Action dated Nov. 7, 2017 for Japanese Patent Application No. 2015-537828, a counterpart foreign application of U.S. Appl. No. 14/056,662, 6 pages.

Translated Japanese Office Action dated Jun. 26, 2018 for Japanese Patent Application No. 2015-537828, a counterpart foreign application of U.S. Appl. No. 14/056,662, 8 pages.

* cited by examiner (PRIOR ART)

SYSTEM, METHOD AND APPARATUS OF DATA INTERACTION UNDER LOAD BALANCING

CROSS REFERENCE TO RELATED PATENT APPLICATION

This application claims foreign priority to Chinese Patent Application No. 201210394875.5 filed on Oct. 17, 2012, entitled "System, Method and Apparatus of Data Interaction under Load Balancing", which is hereby incorporated by reference in its entirety.

TECHNICAL FIELD

The present disclosure relates to the field of communication technology, and in particular, relates to systems, methods and apparatuses of data interaction under load balancing.

BACKGROUND

Due to the current increase in business volume and rapid growth of visitor volume and data traffic, a single server is no longer able to fulfill demands due to bottlenecking of its processing performance. As such, a method, which adopts a server cluster made up of multiple servers and employs a load balancing technology to distribute a large volume of data traffic onto the multiple servers of the server cluster, has emerged.

Figure 1:
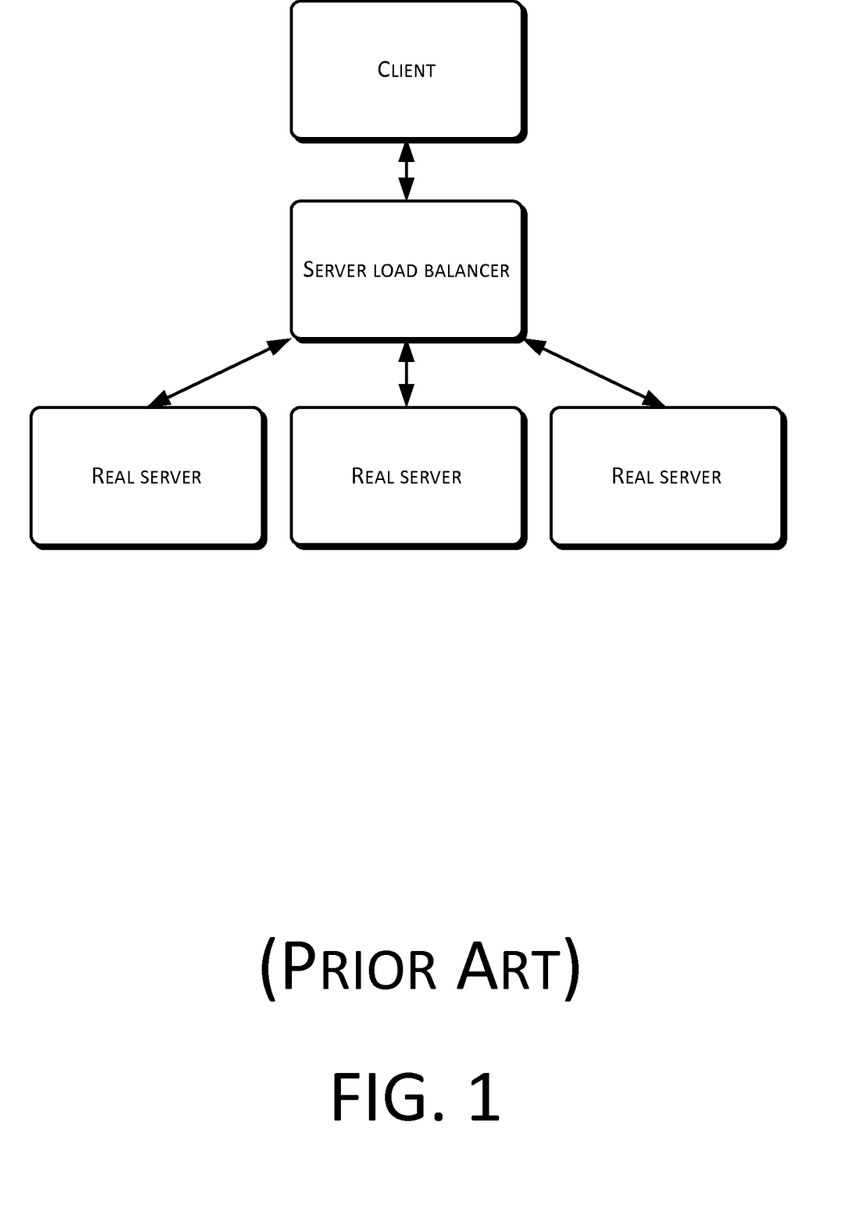
FIG. 1 is a structural diagram illustrating a system of data interaction under load balancing in existing technologies.

FIG. 1 is a structural diagram of a system of data interaction under load balancing in accordance with existing technologies. As shown in FIG. 1, a first data package that is sent by a client for visiting a server initially passes through a server load balancer (SLB), which selects a real server (RS) to serve the client and sends the first data package of the client to the selected real server under existing technologies. After receiving the first data package, the real server returns a second data package to the client through the server load balancer, thus completing one data interaction with the client.

As can be seen from the above processes, the traffic entering a real server initially passes through a server load balancer. The server load balancer selects a real server to serve a client using a specific load balancing strategy. The selected real server performs data interaction with the client through the server load balancer. It is noted that, although the selected real server performs data interaction with the client through the server load balancer, i.e., the traffic flowing from the selected real server to the client also passes through the server load balancer, the server load balancer does not perform a process of load balancing with respect to the traffic flowing from the real server.

However, with regard to the real server, the traffic entering a real server is normally far less than the traffic coming from the real server. Such an enormous amount of traffic coming from the real server also passes through the server load balancer in order to reach the client, thus greatly increasing the workload of the server load balancer.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Embodiments of the present disclosure provide a system, a method and an apparatus of data interaction under load balancing in order to solve the problem of heavy workload of a server load balancer in existing technologies.

In at least one embodiment, the present disclosure provides a system of data interaction under load balancing, which includes:

a server load balancer (SLB) configured to receive a first data package from a client, select a real server (RS) according to a predefined load balancing strategy, adjust a destination address included in the first data package to a real IP (Internet Protocol) address of the selected real server to obtain a second data package, and send the second data package to the selected real server, where the destination address included in the first data package that is sent from the client is a virtual IP address of the server load balancer;

the real server configured to generate a third data package and send the third data package to the client after receiving the second data package, where a source address included in the third data package is a real IP address of the real server; and a conversion apparatus configured to intercept the third data package that is sent from the real server, adjust the source address included in the third data package to the virtual IP address of the server load balancer that has been recorded in advance to obtain a fourth data package, and send the fourth data package to the client.

In some embodiments, the present disclosure provides a method of data interaction under load balancing, which includes:

intercepting, by a conversion apparatus, a third data package sent from a real server (RS) to a client based on a second data package that is received, the third data package having a source address as a real IP (Internet Protocol) address of the real server, where the second data package is obtained by: receiving, by a server load balancer (SLB), a first data package including a destination address that is a virtual IP address of the server load balancer from the client, selecting the real server according to a predefined load balancing strategy, and adjusting the destination address included in the first data package to a real IP address of the real server;

adjusting, by the conversion apparatus, the source address included in the intercepted third data package to a virtual IP address of the server load balancer that is pre-recorded to obtain a fourth data package; and sending the fourth data package to the client.

In some embodiments, the present disclosure provides an apparatus of data interaction for load balancing, which includes:

a first interception module, used for intercepting a third data package that is sent from a real server (RS) to a client based on a second data package that is received, the third data package including a source address that is a real network Internet Protocol (IP) address of the real server, where the second data package is obtained by: receiving, by a server load balancer (SLB), a first data package including a destination address that is a virtual IP address of the server load balancer from the client, selecting the real server according to a predefined load balancing strategy, and adjusting the destination address included in the first data package to a real IP address of the real server;

an adjustment module, used for adjusting the source address included in the intercepted third data package to the virtual IP address of the server load balancer that is pre-recorded to obtain a fourth data package; and a first sending module, used for sending the fourth data package to the client.

The embodiments of the present disclosure provide a system, a method and an apparatus of data interaction under load balancing. The system includes a server load balancer, a real server, and a conversion apparatus. A data package, which is sent from a client to a real server, is processed and sent by the server load balancer to the real server. A data package, which is sent from the real server to the client, is processed and sent by the conversion apparatus to the client. Since the traffic flowing from the real server to the client does not pass through the server load balancer but is processed and sent by the conversion apparatus to the client in the above system as provided by the embodiments of the present disclosure, the workload on the server load balancer is thus effectively reduced.

DETAILED DESCRIPTION

In an existing system as shown in FIG. 1, a data package that is sent from a client to a real server enters the real server after being processed by a server load balancer. When the real server returns another data package to the client based on the data package sent from the client, the returned data package also passes through the server load balancer in order to reach the client. However, in real applications, since the traffic flowing into the real server is normally far less than the traffic flowing from the real server, the existing system increases the workload of the server load balancer, especially when the scale of a real server cluster is so large that the workload of the server load balancer is increased further. Furthermore, since a data package sent from the real server to the client passes through the server load balancer, a route from the real server to a real server gateway (which is default for the real server) is needed to be modified into a route from the real server to the server load balancer. Accordingly, the real server and the server load balancer are needed to be deployed in a same virtual local area network (VLAN), thus reducing the flexibility in deployment of the real server and the server load balancer.

The embodiments of the present disclosure provide a system, a method and an apparatus of data interaction for load balancing. The system includes a server load balancer, a real server, and a conversion apparatus. A data package, which is sent from a client to a real server, is processed and sent by the server load balancer to the real server. A data package, which is sent from the real server to the client, is processed and sent by the conversion apparatus to the client. Since the traffic flowing from the real server to the client does not pass through the server load balancer but is processed and sent by the conversion apparatus to the client in the above example system, the workload on the server load balancer is thus effectively reduced.

The embodiments of the present disclosure will be described below in detail in conjunction with the accompanying figures.

Figure 2:
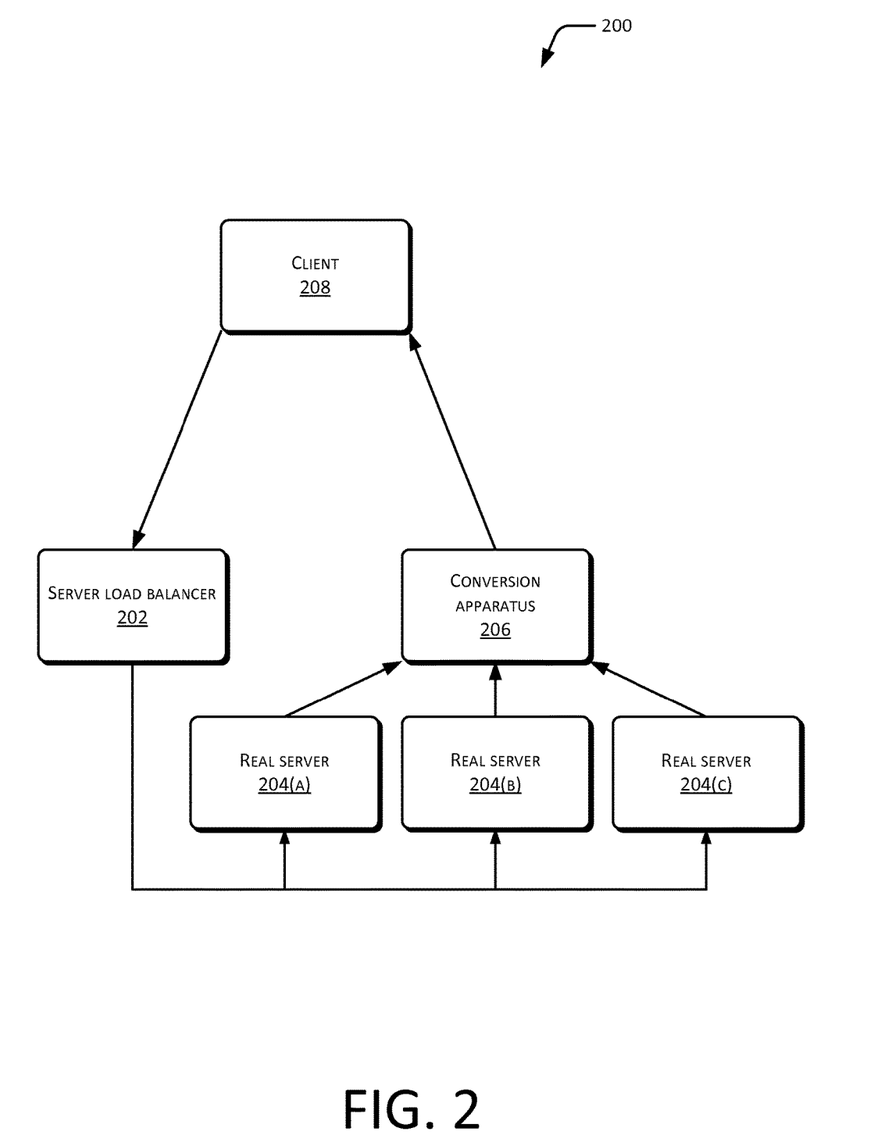
FIG. 2 is a structural diagram illustrating a system of data interaction under load balancing in accordance with the embodiments of the present disclosure.

FIG. 2 is a structural diagram illustrating a system of data interaction for load balancing 200 in accordance with the embodiments of the present disclosure, which includes a server load balancer 202, a plurality of real servers 204(a)-204(c) and a conversion apparatus 206. FIG. 2 also shows a client 208.

Figure 3:
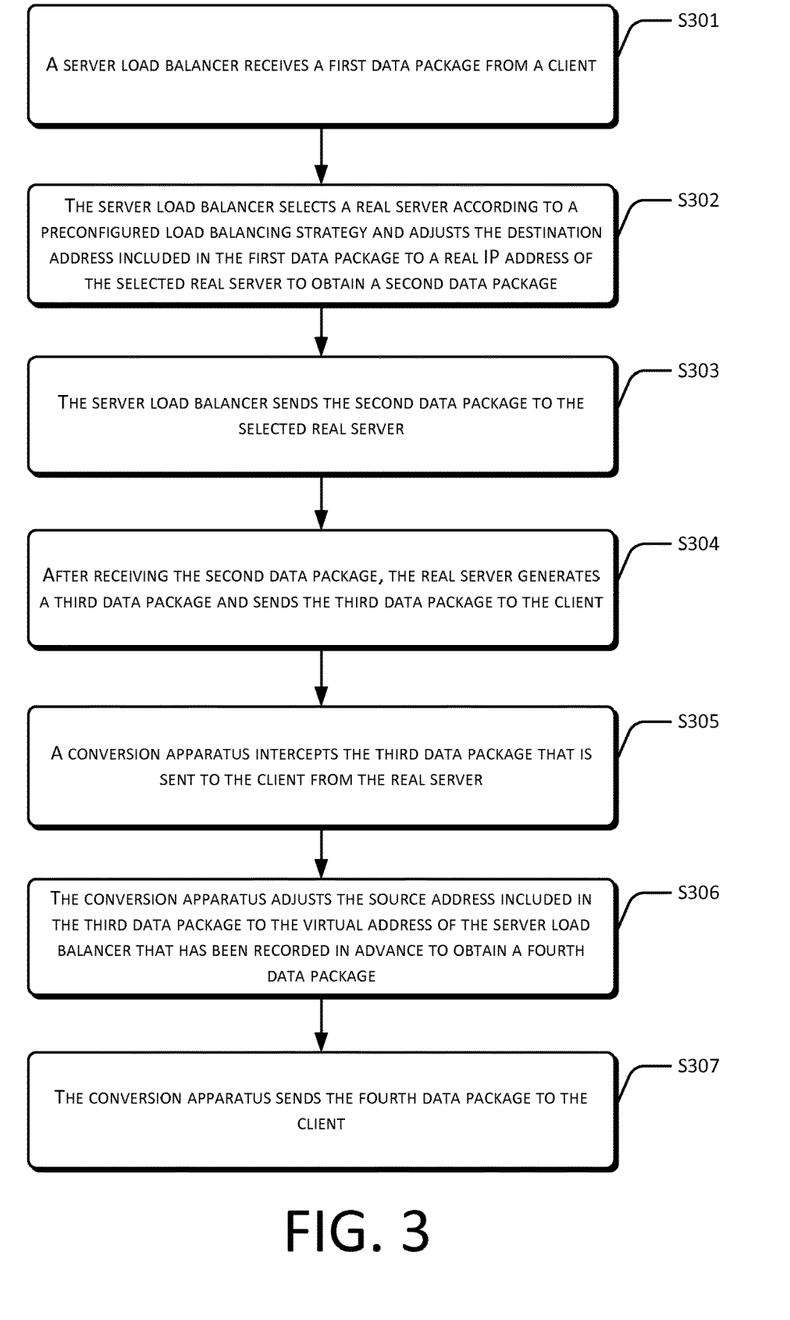
FIG. 3 is a flow chart illustrating a process of data interaction based on the example data interaction system of FIG. 2.

Based on the system as shown in FIG. 2, a process of data interaction between a client 208 and a real server 204(a)-204(c) is shown in FIG. 3. FIG. 3 is a flow chart illustrating a process of data interaction based on the example system of FIG. 2, which includes the following:

S301: The server load balancer receives a first data package from a client. A destination address included in the first data package sent from the client is a virtual internet protocol (IP) address, and a source address included in the first data package is a real IP address of the client.

Generally, when a real server cluster, which is made up of multiple real servers, is used for sharing the traffic that visits a website, the website sets a same virtual IP address for the server load balancer and each real server to facilitate visits of users. Accordingly, when a user visits the website, a client used by the user sends a first data package that includes a destination address as the virtual IP address. As such, the server load balancer will receive the first data package.

S302: The server load balancer selects a real server according to a preconfigured load balancing strategy and adjusts the destination address included in the first data package to a real IP address of the selected real server to obtain a second data package.

In at least one embodiment, after receiving the first data package from the client, the server load balancer selects a real server from the real server cluster based on a preconfigured load balancing strategy to perform data interaction with the client.

In response to selecting the real server, the server load balancer determines a real IP address of the selected real server based on pre-recorded real IP addresses of the real servers that belong to the real server cluster, and then adjusts the destination address included in the first data package (i.e., the virtual IP address of the server load balancer) to the real IP address of the selected real server. At that time, the server load balancer has adjusted the destination address included in the first data package to the real IP address of the selected real server, and treats the first data package that includes the adjusted destination address to be a second data package.

Specifically, a destination address included in the second data package is the real IP address of the selected real server while a source address included in the second data package is still the source address included in the first data package, i.e., the real IP address of the client.

S303: The server load balancer sends the second data package to the selected real server.

S304: After receiving the second data package, the real server generates a third data package and sends the third data package to the client.

In some embodiments, after receiving the second data package from the server load balancer, the real server determines that the destination address included in the second data package is the real IP address of the real server and hence processes the second data package to generate a third data package and sends the third data package to the client.

A source address included in the generated third data package is the real IP address of the real server, and a destination address included in the third data package is the source address included in the second data package, i.e., the real IP address of the client.

S305: The conversion apparatus intercepts the third data package that is sent to the client from the real server.

S306: The conversion apparatus adjusts the source address included in the third data package to the virtual address of the server load balancer that has been recorded in advance to obtain a fourth data package.

Since the first data package sent from the client includes the virtual IP address of the server load balancer as the destination address and the real IP address of the client as the source address, the client only processes a data package having a destination address that is the real IP address of the client and a source address that is the virtual IP address of the server load balancer, and does not process a data package having a source address that is not the virtual IP address of the server load balancer. Accordingly, if the real server directly sends the third data package that has the source address as the real IP address of the real server to the client, the client will not process the third data package, thus leading to an abnormality in data interaction.

In some embodiments, the conversion apparatus therefore intercepts the third data package that is sent from the real server to the client, and adjusts the source address included in the third data package into the virtual address of the server load balancer that is pre-recorded in advance to obtain the fourth data package.

Specifically, the fourth data package includes the source address as the virtual IP address of the server load balancer and the destination address as the same destination address included in the third data package, i.e., the real IP address of the client.

S307: The conversion apparatus sends the fourth data package to the client.

Upon receiving the fourth data package, the client processes the fourth data package to complete data interaction between the client and the real server because the source address (i.e., the virtual IP address of the server load balancer) included in the fourth data package is the same as the destination address (i.e., the virtual IP address of the server load balancer) included in the first data package sent from the client, and the destination address (i.e., the real IP address of the client) included in the fourth data package is the same as the source address (i.e., the real IP address of the client) included in the first data package sent from the client.

Through the above method, a data package (i.e., the first package) which is sent from the client to the real server is processed by the server load balancer, and a data package (i.e., the third data package) which is returned to the client from the real server is processed by the conversion apparatus. In other words, traffic flowing from the real server passes through the conversion apparatus to the client without passing through the server load balancer, thus effectively reducing the workload of the server load balancer.

In at least one embodiment, when only one virtual IP address is set up for the server load balancer and each real server of the real server cluster, this virtual IP address may be directly preconfigured in the conversion apparatus. As shown at S306 of FIG. 3, the conversion apparatus may directly adjust the source address of the third data package according to the preconfigured virtual IP address.

However, taking into account of a situation that two or more websites share a single real server cluster may exist in real applications, two or more virtual IP addresses may exist for the server load balancer and each real server in that situation. For example, virtual IP addresses that are set up for the server load balancer and each real server may include VIP1 and VIP2. According to pre-recorded virtual IP addresses as shown at S306 of FIG. 3, if VIP1 and VIP2 are directly preconfigured in the conversion apparatus, the conversion apparatus may not be able to determine which one of VIP1 and VIP2 may be used for adjustment when adjusting the source address included in the third data package. If an incorrect virtual IP address is used, the accuracy of data interaction between the client and the real server will be affected.

Therefore, in order to ensure the accuracy of data interaction between the client and the real server, an example method of adjusting a first data package to obtain a second data package after the server load balancer receives the first data package includes: the server load balancer retrieving a virtual IP address of the server load balancer that is used as a destination address from the first data package, retrieving a public port number of the server load balancer that is used as a destination port number from the first data package, inserting the retrieved virtual IP address and the retrieved public port number into a TCP option of the first data package, adjusting the destination address included in the first data package to a real IP address of a selected real server and adjusting the destination port number included in the first data package to a port number of the selected real server to obtain the second data package.

The first data package sent by the client includes not only a source address and a destination address, but also a source port number, a destination port number and protocol information. The source port number included in the first data package is a port number of the client and the destination port number is a public port number of the server load balancer.

Using the above method, the server load balancer obtains the second data package that includes the destination address as the real IP address of the selected real server, the destination port number as the port number of the selected real server, the source address still as the real IP address of the client, the source port number still as the port number of the client with the protocol information remaining unchanged. Moreover, the virtual IP address and the public port number of the server load balancer are inserted in the TCP option of the second data package. After obtaining the second data package, the server load balancer sends the second data package to the real server.

Furthermore, the method of pre-recording the virtual IP address of the server load balancer by the conversion apparatus includes: the conversion apparatus intercepting the second data package sent from the server load balancer to the selected real server, determining data flow indicator information associated with data interaction between the client and the real server based on the second data package, recording the virtual IP address and the public port number that are inserted in the TCP option of the second data package, and generating a correspondence relationship between the determined data flow indicator information and the recorded virtual IP address and public port number.

The determined data flow indicator information includes at least one of the source address, the destination address, the source port number, the destination port number and the protocol information included in the second data package.

In at least one embodiment, the source address, the destination address, the source port number, the destination port number and the protocol information that are included in the second data package may be used as the data flow indicator information associated with the data interaction between the client and the real server. Specifically, after a group of five elements (the source address, the destination address, the source port number, the destination port number and the protocol information included in the second data package) is determined, this five-element group is used as the data flow indicator information. Subsequently, the virtual IP address and the public port number that are inserted in the TCP option of the second data package may be recorded, and a correspondence relationship among the five-element group, the virtual IP address and the public port number is set up.

After setting up the correspondence relationship among the data flow indicator information, the recorded virtual IP address and the recorded public port number, the conversion apparatus transfers the intercepted second data package to the real server, which conducts subsequent operations on the second data package.

Correspondingly, when the conversion apparatus records the virtual IP address of the server load balancer using the above method, a method of obtaining a fourth data package by adjusting the source address included in the intercepted third data package that is sent from the real server to the client into the pre-recorded virtual IP address of the server load balancer includes: the conversion apparatus determining data flow indicator information based on the intercepted third data package that is sent from the real server, searching for a virtual IP address and a public port number that correspond to the data flow indicator information determined from the third data package, adjusting the source address included in the third data package into a virtual IP address that is found, and adjusting the source port number included in the third data package into a public port number that is found to obtain a fourth data package.

Figure 4:
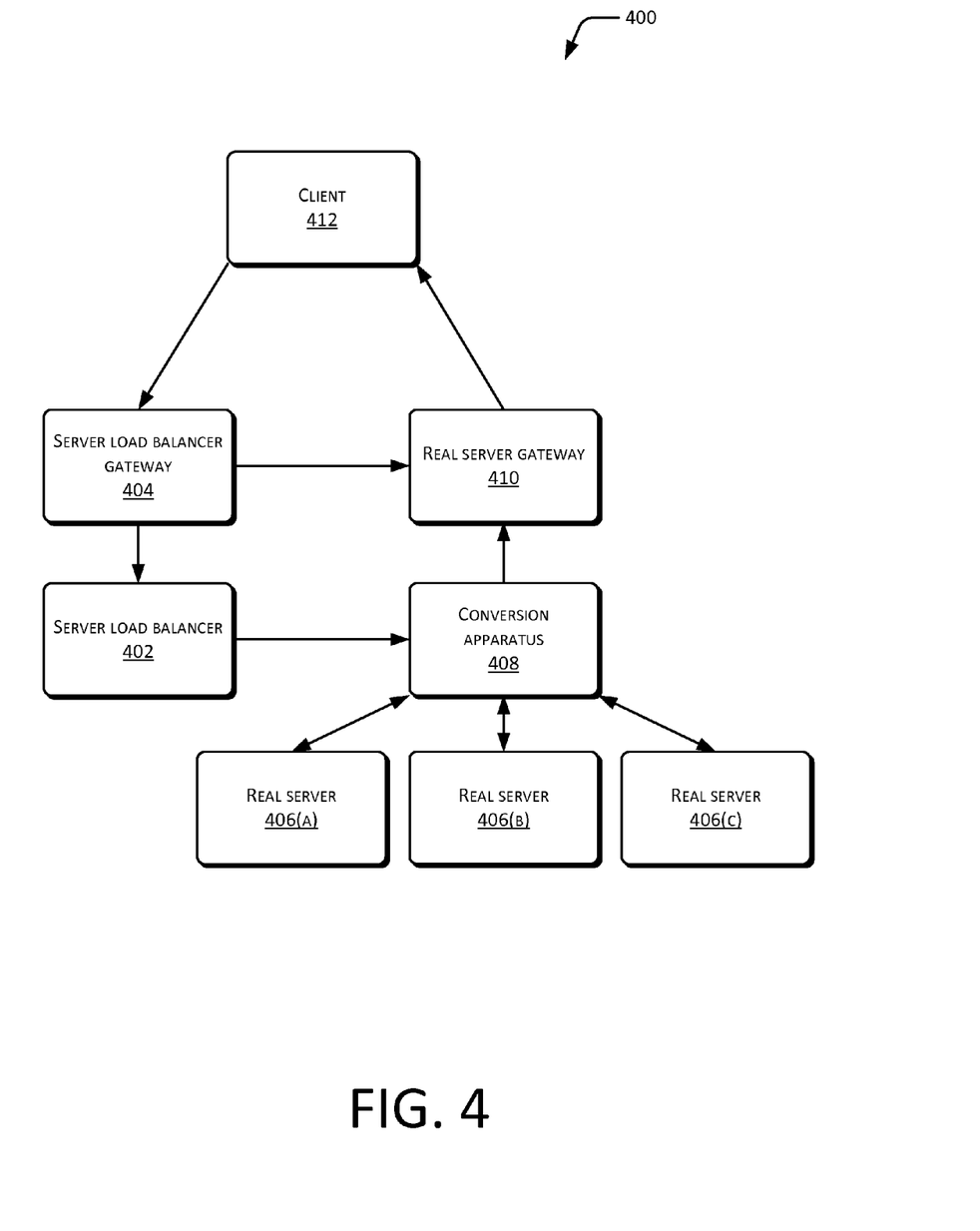
FIG. 4 is a structural diagram illustrating details of a system of data interaction under load balancing in accordance with the embodiments of the present disclosure.

FIG. 4 is a structural diagram illustrating details of a system of data interaction under load balancing 400 in accordance with the embodiments of the present disclosure, which includes a server load balancer 402, a server load balancer gateway 404, a plurality of real servers 406(*a*)-406(*c*), a conversion apparatus 408, and a real server gateway 410. FIG. 4 also shows a client 412.

Figure 5:
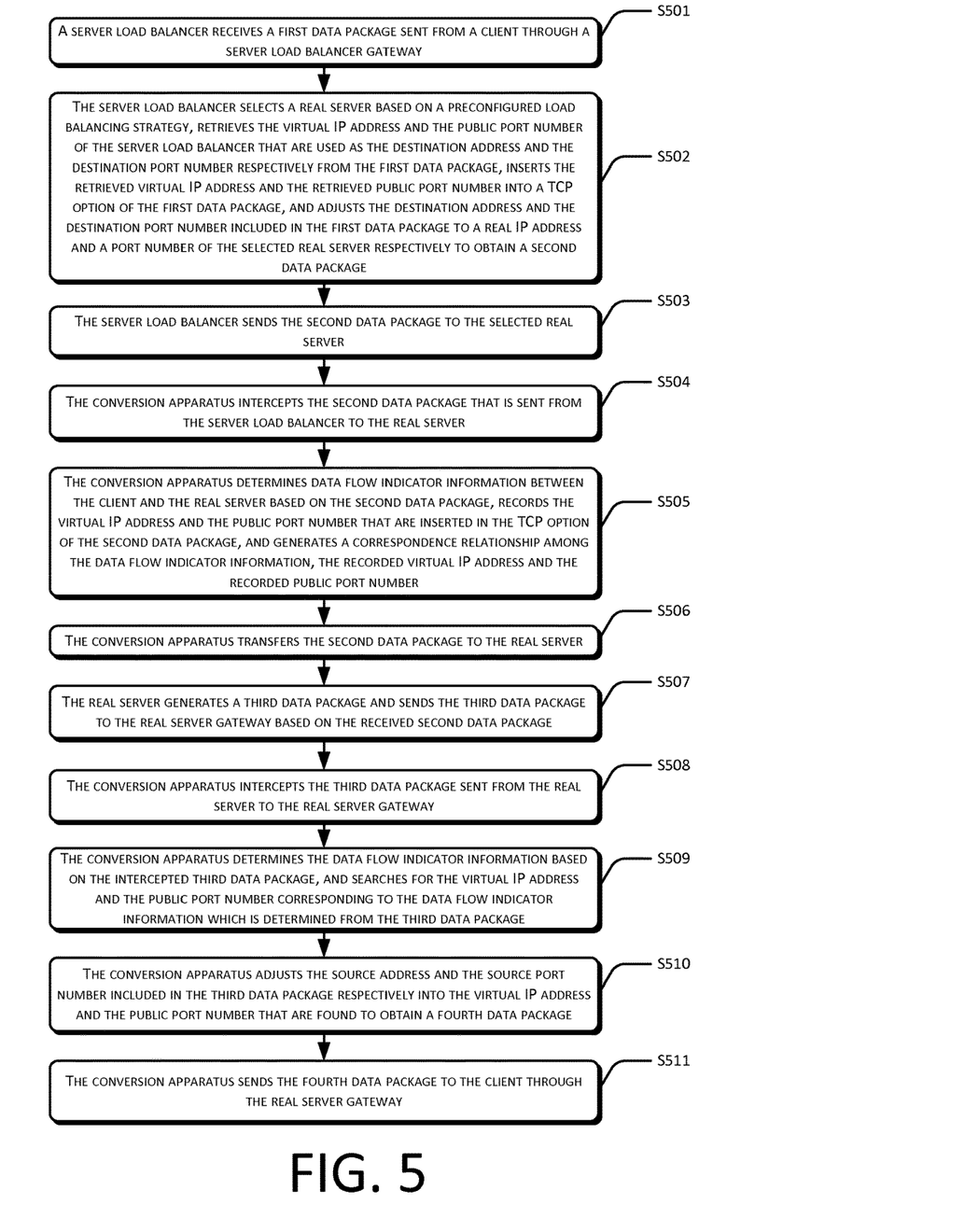
FIG. 5 is a flow chart illustrating details of a process of data interaction based on the example data interaction system of FIG. 4.

FIG. 5 is a flow chart illustrating details of a process of data interaction based on the example system of FIG. 4, which includes the following:

S501: The server load balancer receives a first data package sent from a client through the server load balancer gateway.

For example, if a virtual IP address of the server load balancer is VIP1, a public port number of the server load balancer is Np, a real IP address of the client is IPc and a port number of the client is Nc, the first data package received by the server load balancer includes a source address as IPc, a destination address as VIP1, a source port number as Nc, a destination port number as Np, and protocol information as protocol information used by the client.

S502: The server load balancer selects a real server based on a preconfigured load balancing strategy, retrieves the virtual IP address and the public port number of the server load balancer that are used as the destination address and the destination port number respectively from the first data package, inserts the retrieved virtual IP address and the retrieved public port number into a TCP option of the first data package, and adjusts the destination address and the destination port number included in the first data package to a real IP address and a port number of the selected real server respectively to obtain a second data package.

Using the previous example, after receiving the first data package, the server load balancer selects a real server based on a preconfigured load balancing strategy, retrieves the destination address and the destination port number from the first data package, i.e., VIP1 and Np, and inserts the retrieved VIP1 and Np into a TCP option of the first data package. If a real IP address of the real server selected by the server load balancer is the IPr and a port number of the real server is Nr, the server load balancer will adjust the destination address of the first data package to IPr and adjust the port number of the first data package to Nr to obtain the second data package.

The obtained second data package includes a source address as IPC, a destination address as IPr, a source port number as Nc, a destination port number as Nr with protocol information remaining unchanged and a TCP option being inserted with VIP1 and Np.

S503: The server load balancer sends the second data package to the selected real server.

S504: The conversion apparatus intercepts the second data package that is sent from the server load balancer to the real server.

S505: The conversion apparatus determines data flow indicator information between the client and the real server based on the second data package, records the virtual IP address and the public port number that are inserted in the TCP option of the second data package, and generates a correspondence relationship among the data flow indicator information, the recorded virtual IP address and the recorded public port number.

Using the previous example, after intercepting the second data package that includes the source address of IPC, the destination address of IPr, the source port number of Nc, the destination port number of Nr with the TCP option being inserted with VIP1 and Np, the conversion apparatus sets a five-element group (i.e., the source address (IPc), the destination address (IPr), the source port number (Nc), the destination port number (Nr) and protocol information that are included in the second data package) as the data flow indicator information associated with the data interaction between the client and the real server. In other words, this five-element group is used to uniquely identify a data flow between the client and the real server. The conversion apparatus then records the virtual IP address and the public port number that are inserted in the TCP option of the second data package, i.e., VIP1 and Np, and generates a correspondence relationship among the five-element group and the recorded VIP1 and Np.

S506: The conversion apparatus transfers the second data package to the real server.

S507: The real server generates a third data package and sends the third data package to the real server gateway based on the received second data package.

Using the previous example, after receiving the second data package, the real server determines that the second data package includes the destination address as IPr, i.e., the real IP address of the real server, and the destination port number as Nr, i.e., the port number of the real server, and then generates the third data package based on the second data package.

The generated third data package includes a source address as the real IP address of the real server, i.e., IPr, a destination address as the source address of the second data package, i.e., the real IP address of the client (IPc), a source port number as the port number of the real server, i.e., Nr, a destination address as the source port number of the second data package, i.e., Nc, with protocol information remaining unchanged.

After generating the above third data package, the real server may send the third data package to the real server gateway according to a default route from the real server to the real server gateway such that the real server gateway sends the third data package to the client according to the destination address (IPC) and the destination port number (Nc) included in the third data package.

S508: The conversion apparatus intercepts the third data package sent from the real server to the real server gateway.

S509: The conversion apparatus determines the data flow indicator information based on the intercepted third data package, and searches for the virtual IP address and the public port number corresponding to the data flow indicator information which is determined from the third data package.

Using the previous example, since the data flow indicator information corresponding to VIP1 and Np are recorded by the conversion apparatus as a group of five elements including IPc, IPr, Nc, Nr and protocol information at S505 and the data flow indicator information determined from the third data package is also the above group of five elements, the conversion apparatus may therefore determine that the third data package belongs to one of the data packages included in a data flow (i.e., a data flow between the client and the real server) indicated by the above group of five elements, and hence search for a virtual IP address and a public port number corresponding to the data flow indicator information (i.e., searching for a virtual IP address and a public port number corresponding to the above group of five elements) to find that the virtual IP address and the public port number are VIP1 and Np respectively.

S510: The conversion apparatus adjusts the source address and the source port number included in the third data package respectively into the virtual IP address and the public port number that are found to obtain a fourth data package.

Using the previous example, since the virtual IP address and the public port number that are found are VIP1 and Np respectively, the conversion apparatus adjusts the source address included in the third data package from IPr to VIP1 and the source port number from Nr to Np to obtain a fourth data package.

In other words, the obtained fourth data package includes a source address as VIP1, a destination address as IPc, a source port number as Np and a destination address as Nc with protocol information remaining unchanged.

S511: The conversion apparatus sends the fourth data package to the client through the real server gateway.

Using the previous example, the conversion apparatus first sends the fourth data package to the real server gateway, which then sends the fourth data package to the client based on the destination address and the destination port number included in the fourth data package. Since the first data package that is initially sent from the client includes the source address as IPc, the destination address as VIP1, the source port number as Nc, the destination port number as Np and the protocol information as the protocol information used by the client, while the fourth data package received by the client includes the source address as VIP1, the destination address as IPc, the source port number as Np, the destination port number as Nc and the protocol information that are unchanged, the client will therefore process the fourth data package, thus completing interaction between the client and the real server.

As can be seen from the process shown in FIG. 5, in the embodiments of the present disclosure, the conversion apparatus uniquely indicates a data flow associated with data interaction between a client and a real server using data flow indicator information, generates a correspondence relationship among the data flow indicator information, a virtual IP address and a public port number. When a data package sent from the real server to the client is intercepted, the conversion apparatus may determine data flow indicator information based on the intercepted data package, and adjust the intercepted data package based on a corresponding virtual IP address and a corresponding public port number that are found, thus guaranteeing the accuracy of data interaction between the client and the real server.

Furthermore, in existing technologies, since a data package sent from a real server to a client is needed to pass through a server load balancer, a route from the real server to a real server gateway (which is default for the real server) is needed to be modified into a route from the real server to the server load balancer. Accordingly, the real server and the server load balancer are needed to be deployed in a same virtual local area network (VLAN), thus reducing the flexibility in deployment of the real server and the server load balancer.

On the other hand, as can be seen from the system of FIG. 4 and the process of FIG. 5, in the embodiments of the present disclosure, the conversion apparatus is deployed between a real server and a real server gateway, and intercepts a data package that is sent from the real server to a client through the real server gateway. As such, the default route of the real server from the real server to the real server gateway is not needed to be modified, and the conversion apparatus is invisible to the real server. Accordingly, only the real server and the conversion apparatus are needed to be deployed in a same virtual local area network in the system shown in FIG. 4, without the need of deploying the real server and the server load balancer in the same virtual local area network. Specifically, the real server and the conversion apparatus may be located in a first virtual local area network, and the server load balancer may be located in a second virtual local area network, thus effectively enhancing the flexibility in deployment of the real server and the server load balancer.

In addition, in real applications, a process of data interaction between a client and a real server initially needs to perform a three-way handshake to establish a virtual connection. After the client establishes the virtual connection through the three-way handshake, the first to be sent is a synchronize sequence number (SYN) data package.

Therefore, based on the above circumstances, in the data interaction process that is provided in the embodiments of the present disclosure above, if the server load balancer determines that a first data package received from the client is a SYN data package, the server load balancer extracts a virtual IP address (which is included as a destination address) and a public port number (which is included as a destination port number) from the first data package, inserts the retrieved virtual IP address and the retrieved public port number into a TCP option of the SYN data package, performs adjustment to a destination address and a destination port number of the SYN data package, and sends the SYN data package to the real server. Correspondingly, after intercepting the SYN data package, the conversion apparatus determines data flow indicator information based on the SYN data package, generates a correspondence relationship among the data flow indicator information, the virtual IP address and the public port number which have been inserted into the TCP option of the SYN data package, and sends the SYN data package to the real server for conducting subsequent operations.

On the contrary, if the server load balancer determines that the first data package received from the client is not a SYN data package (which indicates that the SYN data package in a data flow associated with the first data package has been processed by the server load balancer and the conversion apparatus and further indicates that data flow indicator information associated with the first data package has been determined by the conversion apparatus and a correspondence relationship among the data flow indicator information, the virtual IP address and the public port number has been generated), the server load balancer does not need to insert the virtual IP address and the public port number included in the first data package into the TCP option of the first data package, and only needs to adjust the destination address and the destination port number in the first data package, and sends the first data package to the real server. Correspondingly, after intercepting the first data package, the conversion apparatus does not need to determine the data flow indicator information and establish the correspondence relationship among the data flow indicator information, the virtual IP address and the public port number because the virtual IP address and the public port number are not inserted in the TCP option of the first data package. The conversion apparatus may directly send the first data package to a corresponding real server and conduct subsequent operations.

In some embodiments, a real server in the real server cluster may be a real server in form of a virtual machine (VM) and may be executed on a hypervisor of a network device that is located in a same virtual local area network of the conversion apparatus.

Figure 6:
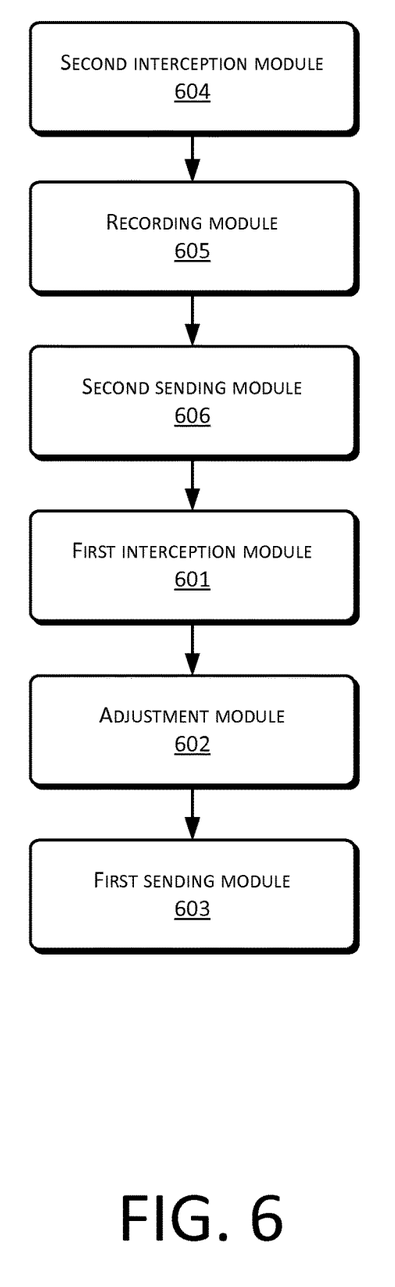
FIG. 6 is a structural diagram illustrating an apparatus of data interaction under load balancing in accordance with the embodiments of the present disclosure.

FIG. 6 is a structural diagram illustrating an apparatus of data interaction under load balancing in accordance with the embodiments of the present disclosure, which includes:

a first interception module 601, used for intercepting a third data package that is sent from a real server (RS) to a client based on a second data package received, the third data package including a source address that is a real network Internet Protocol (IP) address of the real server, where the second data package is obtained by: receiving, by a server load balancer (SLB), a first data package including a destination address that is a virtual IP address of the server load balancer from the client, selecting the real server according to a predefined load balancing strategy, and adjusting the destination address included in the first data package to a real IP address of the real server;

an adjustment module 602, used for adjusting the source address included in the intercepted third data package to the virtual IP address of the server load balancer that is pre-recorded to obtain a fourth data package; and a first sending module 603, used for sending the fourth data package to the client.

The apparatus further includes:

a second interception module 604, used for intercepting the second data package that is sent from the server load balancer to the real server, where the second data package is obtained by: retrieving, by the server load balancer, the virtual IP address of the server load balancer that is used as a destination address from the first data package, retrieving a public port number of the server load balancer that is used as a destination port number from the first data package, inserting the retrieved virtual IP address and the retrieved public port number into a TCP option of the first data package, adjusting the destination address included in the first data package to the real IP address of the selected real server, and adjusting the destination port number included in the first data package to a port number of the selected real server;

a recording module 605, used for determining data flow indicator information associated with data interaction between the client and the real server based on the second data package, recording the virtual IP address and the public port number that are inserted in the TCP option of the second data package, and establishing a correspondence relationship among the data flow indicator information, the recorded virtual IP address and the recorded public port number, where the determined data flow indicator information includes at least one of: a source address, a destination address, a source port number, a destination port number, and protocol information included in the second data package; and a second sending module 606, used for sending the second data package to the real server.

The adjustment module 602 is used for determining the data flow indicator information based on the intercepted third data package that is sent from the real server, searching for a virtual IP address and a public port number corresponding to the data flow indicator information that is determined from the third data package, adjusting the source address included in the third data package to a virtual IP address that is found, and adjusting the source port number included in the third data package to a public port number that is found to obtain the fourth data package.

Specifically, the data interaction apparatus under load balancing may be located in the conversion apparatus.

Figure 7:
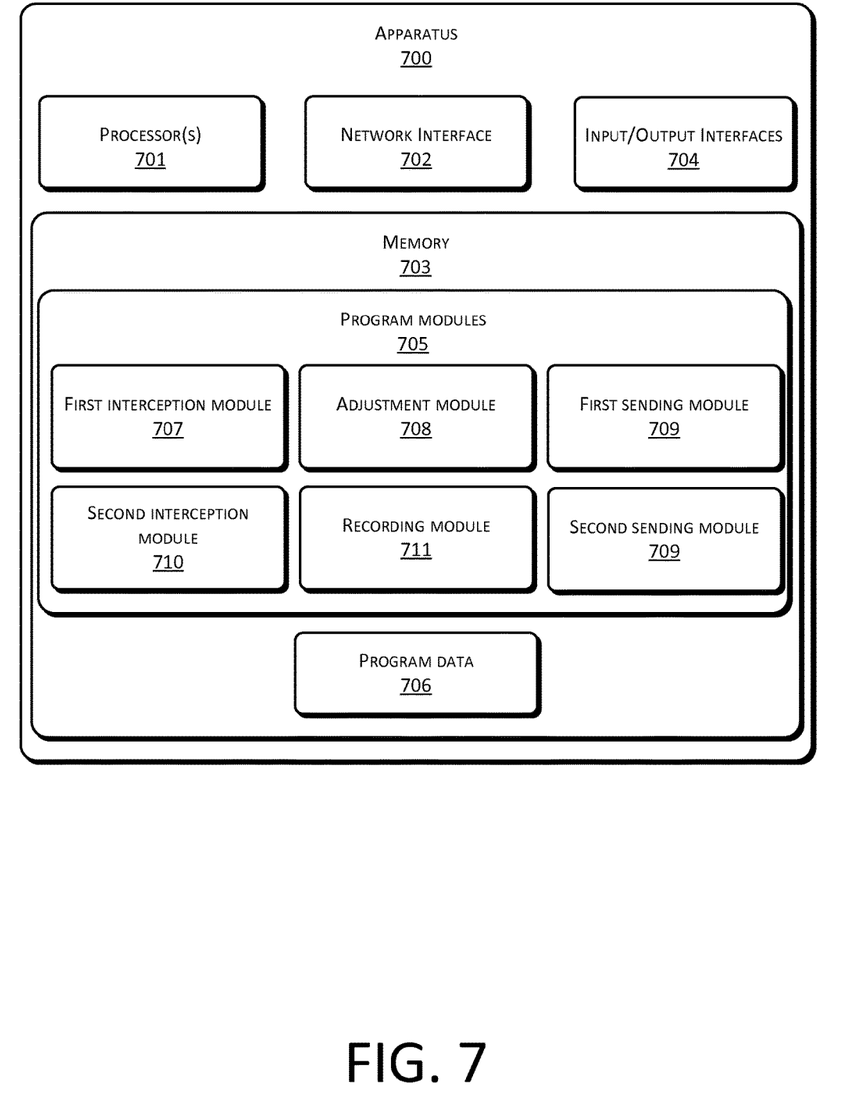
FIG. 7 is a structural diagram illustrating the example apparatus as described in FIG. 6.

FIG. 7 illustrates an example apparatus 700, such as the apparatus as described above, in more detail. In one embodiment, the apparatus 700 can include, but is not limited to, one or more processors 701, a network interface 702, memory 703, and an input/output interface 704.

The memory 703 may include computer-readable media in the form of volatile memory, such as random-access memory (RAM) and/or non-volatile memory, such as read only memory (ROM) or flash RAM. The memory 703 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 703 may include program modules 705 and program data 706. In one embodiment, the program modules 705 may include a first interception module 707, an adjustment module 708, a first sending module 709, a second interception module 710, a recording module 711 and a second sending module 712. Details about these program modules may be found in the foregoing embodiments described above.

The embodiments of the present disclosure provide a system, a method and an apparatus of data interaction under load balancing. The system includes a server load balancer, a real server, and a conversion apparatus. A data package, which is sent from a client to a real server, is processed and sent by the server load balancer to the real server. A data package, which is sent from the real server to the client, is processed and sent by the conversion apparatus to the client. Since the traffic flowing from the real server to the client does not pass through the server load balancer but is processed and sent by the conversion apparatus to the client in the above system that is provided by the embodiments of the present disclosure, the workload on the server load balancer is thus effectively reduced.

A technical person skilled in the art should understand that the embodiments of the present disclosure may be implemented as methods, systems, or products of computer software. Therefore, the present disclosure may be implemented in forms of hardware, software, or a combination of hardware and software. Further, the present disclosure may be implemented in the form of products of computer software executable on one or more computer readable storage media (including but not limited to disk storage device, CD-ROM, optical storage device, etc.) that include computer readable program instructions.

A technical person skilled in the art may make changes and modifications of the present application without departing from the spirit and scope of the present disclosure. If these changes and modifications are within the scope of the claims and their equivalents of the present disclosure, the present disclosure intends to covers such changes and modifications.

The invention claimed is:

1. A system of data interaction for load balancing, comprising:
a server load balancer, separate from a conversion apparatus, configured to receive a first data package from a client through a server load balancer gateway, select a real server according to a predefined load balancing strategy, adjust a destination address included in the first data package to a real IP (Internet Protocol) address of the selected real server to obtain a second data package, and send the second data package to the selected real server, the destination address included in the first data package sent from the client being a virtual IP address of the server load balancer;
the conversion apparatus intercepts the second data package sent from the server load balancer and transfer the second data package to the selected real server;
the selected real server configured to generate a third data package after receiving the second data package, the third data package including a source address as the real IP address of the selected real server, and to send the third data package to the client through a real sever gateway; and
the conversion apparatus, separate from the server load balancer, configured to intercept the third data package sent from the selected real server, adjust the source address included in the third data package to the virtual IP address of the server load balancer to obtain a fourth data package, and send the fourth data package to the client through the real server gateway.

2. The system as recited in claim 1, wherein the server load balancer is further configured to:
retrieve the virtual IP address of the server load balancer that is used as the destination address in the first data package,
retrieve a public port number of the server load balancer that is used as a destination port number in the first data package,
insert the retrieved virtual IP address and the retrieved public port number into a TCP option of the first data package, and
adjust the destination address included in the first data package to the real IP address of the selected real server and the destination port number included in the first data package to a port number of the selected real server to obtain the second data package.

3. The system as recited in claim 1, wherein the conversion apparatus is further configured to:
determine data flow indicator information associated with data interaction between the client and the selected real server based on the second data package,
record a virtual IP address and a public port number that are inserted in a TCP option of the second data package,
generate a correspondence relationship among the determined data flow indicator information, the recorded virtual IP address and the recorded public port number, and
send the second data package to the selected real server.

4. The system as recited in claim 3, wherein the determined data flow indicator information comprises at least one of: a source address, a destination address, a source port number, a destination port number, and protocol information included in the second data package.

5. The system as recited in claim 3, wherein the conversion apparatus is further configured to determine the data flow indicator information based on the intercepted third data package sent from the selected real server, search for the virtual IP address and the public port number corresponding to the data flow indicator information that is determined from the third data package, adjust the source address included in the third data package to the virtual IP address that is found and the source port number included in the third data package to the public port number that is found to obtain the fourth data package.

6. The data interaction system as recited in claim 1, wherein the conversion apparatus and the selected real server are located in a first virtual local area network (VLAN), and the server load balancer is located in a second virtual local area network.

7. A method of data interaction under load balancing, comprising:

receiving, by a server load balancer from a client through a server load balancer gateway, a first data package including a destination address being a virtual IP (Internet Protocol) address of the server load balancer, selecting a real server according to a predefined load balancing strategy, adjusting the destination address included in the first data package to a real IP address of the selected real server to obtain a second data package, and sending the second data package to the selected real server;

intercepting, by a conversion apparatus that is separate from the server load balancer, the second data package and transferring the second data package to the selected real server;

intercepting, by the conversion apparatus, a third data package sent from the selected real server to the client, the third data package being generated by the selected real server based on the second data package and including a source address as the real IP address of the selected real server;

adjusting, by the conversion apparatus, the source address included in the intercepted third data package to the virtual IP address of the server load balancer to obtain a fourth data package; and sending, by the conversion apparatus, the fourth data package to the client, wherein the fourth data package goes to the client from the selected real server through a real server gateway.

8. The method as recited in claim 7, wherein adjusting the destination address included in the first data package to the real IP address of the selected real server to obtain the second data package comprises:

retrieving, by the server load balancer, the virtual IP address of the server load balancer that is used as the destination address from the first data package;

retrieving a public port number of the server load balancer that is used as a destination port number from the first data package;

inserting the retrieved virtual IP address and the retrieved public port number into a TCP option of the first data package; and adjusting the destination address included in the first data package to the real IP address of the selected real server and the destination port number included in the first data package to the port number of the selected real server to obtain the second data package.

9. The method as recited in claim 7, further comprising pre-recording, by the conversion apparatus, the virtual address of the server load balancer, the pre-recording comprising:

determining data flow indicator information associated with data interaction between the client and the selected real server based on the second data package, wherein the data flow indicator information comprises at least one of: a source address, a destination address, a source port number, a destination port number and protocol information;

recording the virtual IP address and a public port number that are inserted in a TCP option of the second data package; and generating a correspondence relationship among the data flow indicator information, the recorded virtual IP address and the recorded public port number.

10. The method as recited in claim 7, wherein the conversion apparatus adjusting the source address included in the intercepted third data package to the virtual IP address of the server load balancer to obtain the fourth data package comprises:

determining, by the conversion apparatus, data flow indicator information based on the intercepted third data package sent from the selected real server;

searching for a virtual IP address and a public port number corresponding to the data flow indicator information that is determined from the third data package; and adjusting the source address included in the third data package to a virtual IP address that is found and a source port number included in the third data package to a public port number that is found to obtain the fourth data package.

11. An apparatus of data interaction under load balancing, comprising:

one or more processors; and a memory including instructions executable by the one or more processors, which when executed perform the following steps:

receiving, by a server load balancer from a client through a server load balancer gateway, a first data package including a destination address being a virtual IP (Internet Protocol) address of the server load balancer, selecting a real server according to a predefined load balancing strategy, adjusting the destination address included in the first data package to a real IP address of the selected real server to obtain a second data package, and sending the second data package to the selected real server;

intercepting, by a conversion apparatus that is separate from the server load balancer, the second data package and transferring the second data package to the selected real server;

intercepting, by the conversion apparatus, a third data package sent from the selected real server to the client, the third data package being generated by the selected real server based on the second data package and including a source address as the real IP address of the selected real server;

adjusting, by the conversion apparatus, the source address included in the intercepted third data package to the virtual IP address of the server load balancer to obtain a fourth data package; and sending, by the conversion apparatus, the fourth data package to the client, wherein the fourth data package goes to the client from the selected real server through a real server gateway.

12. The apparatus as recited in claim 11, wherein the second data package is obtained by:

retrieving, by the server load balancer, the virtual IP address of the server load balancer that is used as the destination address from the first data package, retrieving a public port number of the server load balancer that is used as a destination port number from the first data package, inserting the retrieved virtual IP address and the retrieved public port number into a TCP option of the first data package, adjusting the destination address included in the first data package to the real IP address of the selected real server, and adjusting the destination port number included in the first data package to a port number of the selected real server.

13. The apparatus as recited in claim 11, further comprising determining data flow indicator information associated with data interaction between the client and the selected real server based on the second data package, recording a virtual IP address and a public port number that are inserted in a TCP option of the second data package, and establishing a correspondence relationship among the data flow indicator information, the recorded virtual IP address and the recorded public port number.

14. The apparatus as recited in claim 13, wherein the determined data flow indicator information includes at least one of: a source address, a destination address, a source port number, a destination port number, and protocol information included in the second data package.

15. The apparatus as recited in claim 11, further comprising determining data flow indicator information based on the intercepted third data package sent from the selected real server.

16. The apparatus as recited in claim 15, further comprising searching for the virtual IP address and the public port number corresponding to the data flow indicator information that is determined from the third data package.

17. The apparatus as recited in claim 16, further comprising adjusting the source address included in the third data package to a virtual IP address that is found, and adjusting the source port number included in the third data package to a public port number that is found to obtain the fourth data package.

* * * * *